(12) United States Patent
Lo et al.

(10) Patent No.: US 7,239,786 B2
(45) Date of Patent: Jul. 3, 2007

(54) HOLLOW OPTICAL WAVEGUIDE BY OMNI-DIRECTIONAL REFLECTORS

(75) Inventors: Shih-Shou Lo, Taoyuan (TW); Chii-Chang Chen, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 11/162,495

(22) Filed: Sep. 13, 2005

(65) Prior Publication Data

US 2007/0058916 A1    Mar. 15, 2007

(51) Int. Cl.
*G02B 6/10*    (2006.01)
(52) U.S. Cl. .................... 385/131; 385/129
(58) Field of Classification Search ........ 385/129–133
See application file for complete search history.

(56) References Cited

U.S. PATENT DOCUMENTS

| | | | |
|---|---|---|---|
| 5,525,190 A * | 6/1996 | Wojnarowski et al. ...... | 385/133 |
| 6,463,200 B2 | 10/2002 | Fink et al. .................. | 385/123 |
| 6,603,911 B2 | 8/2003 | Fink et al. .................. | 385/123 |
| 2006/0088265 A1 * | 4/2006 | Akiyama et al. ........... | 385/129 |

OTHER PUBLICATIONS

Article titled "Semiconductor hollow optical waveguides formed by omni-directional reflectors" jointly authored by Lo et al., Optics Express vol. 12, No. 26, pp. 6589-6593, Dec. 27, 2004.
Article titled "Design of Omndirectional reflector air-waveguide" jointly authored by Chen et al., Institute of Optical Sciences, National Central University.
Article titled "Guiding Optical Light in Air Using an All-dielectric Structure" jointly published by Fink et al., Journal of Lightwave Technology, vol. 17, No. 11, Nov. 1999.

* cited by examiner

*Primary Examiner*—Kevin S Wood
(74) *Attorney, Agent, or Firm*—Jianq Chyun IP Office

(57) ABSTRACT

A semiconductor hollow optical waveguide (SHOW-ODR) device. The semiconductor hollow optical waveguide device comprises a bottom substrate having a trench within, a first omni-directional reflector conformal located on the bottom substrate, and a top substrate having a second omni-directional reflector and located on the bottom substrate with the second omni-directional reflector in contact with the first omni-directional reflector. In addition, a portion of the first omni-directional reflector in the trench and a portion of the second omni-directional reflector over the trench together form an air channel.

6 Claims, 4 Drawing Sheets

HOLLOW OPTICAL WAVEGUIDE BY OMNI-DIRECTIONAL REFLECTORS

BACKGROUND OF THE INVENTION

1. Field of the Invention

The present invention relates to a type of semiconductor waveguide device. In particular, the present invention relates to a hollow semiconductor optical waveguide device and a method of manufacturing the same.

2. Description of the Related Art

Modern high-speed communications systems are increasingly using optical waveguides including optical fiber for transmitting and receiving broadband data. The properties of the optical waveguides made from optical fiber with respect to flexibility and ease of handling and installation are driving forces for their implementation in broadband applications, short-haul data transmission applications such as fiber to the home, local area networks (LAN), high frequency interconnects, industrial diagnostic, and consumer entertainment systems. Such conventional waveguide structures however suffer the fundamental limitations associated with light propagation through solids such as dispersion, absorption, scattering, and nonlinear effects.

Metallic hollow waveguides have been attempted. But they may suffer strong absorption loss in the high-frequency electromagnetic wave. This behavior restricts them to for low-frequencies applications. Therefore, their uses are limited because most high-speed broadband communication systems operate in high-frequency modes.

One method of apply dielectric coating on hollow waveguide air channel is found in a technology called Antiresonant Reflecting Optical Waveguide (ARROW). U.S. Pat. No. 5,606,570 discloses a semiconductor laser device having an ARROW structure; the ARROW structure confines light in an air channel region; it includes air channel regions having a low effective refractive index, and other regions having a high equivalent refractive index. The first refractive index regions function as reflectors, and the lower refractive index regions suppress leakage of light. Thus, the semiconductor laser device can be controlled so as to operate as an optical waveguide. The ARROW technology corresponding to the above patent has a structure which requires a regrowth technique. According to the structure, InGaP, InAlP, or GaAs layers are exposed at the surface as a base layer of the regrowth at the time of the regrowth. Therefore, P-As interdiffusion occurs at the exposed surface during a process of raising temperature for the regrowth, and thus the regrowth is likely to become defective. As a result, the above semiconductor laser element is not practicable.

SUMMARY OF THE INVENTION

It is an objective of the present invention to provide hollow optical waveguide type semiconductor device and a method of manufacturing the same in which a semiconductor hollow optical waveguide (SHOW-ODR) device, formed with an air channel as small as 1.2-micron ×1.3-micron, can be manufactured at lower cost, lower uniform polarization independent loss, polarization-independence, and higher temperature stability.

The invention relates to a semiconductor hollow optical waveguide (SHOW-ODR) device. The semiconductor hollow optical waveguide device comprises the following structure: a bottom substrate having a trench within, a first omni-directional reflector conformal located on the bottom substrate, and a top substrate having a second omni-directional reflector and located on the bottom substrate with the second omni-directional reflector in contact with the first omni-directional reflector. Notably, a portion of the first omni-directional reflector in the trench and a portion of the second omni-directional reflector over the trench together form an air channel.

The aforementioned first omni-directional reflector include a plurality of first material layers having a first refractive index; and a plurality of second material layers having a second refractive index, in which the first material layer and the second material layer are alternatively arranged; and the ratio of the first refractive index to the second refractive index is no less than 1.5.

The first material layer for the first omni-directional reflector includes Si, SiO2, TiO2, GaAs, InP, and InAlGaAs. In addition, the second material layer for the first omni-directional reflector includes the oxide of Si, GaAs, InP, and InAlGaAs. Although both the first material layer and second material layer comes from the same list of possible materials, they cannot be identical for the same SHOW-ODR device; in other words, the adjacent alternating first material layer and second material layer must include materials of different refractive indices.

The aforementioned second omni-directional reflector includes a plurality of first material layers having a first refractive index and a plurality of second material layers having a second refractive index. The first material layer and the second material layer are alternatively arranged; and the ratio of the first refractive index to the second refractive index is no less than 1.5.

The first material layer for the second omni-directional reflector includes Si, SiO2, TiO2, GaAs, InP, and InAlGaAs. In addition, the second material layer for the second omni-directional reflector includes the oxide of Si, GaAs, InP, and InAlGaAs. Although both the first material layer and second material layer comes from the same list of possible materials, they cannot be identical for the same SHOW-ODR device; in other words, the adjacent alternating first material layer and second material layer must include materials of different refractive indices.

The aforementioned air channel for the SHOW-ODR device has the following dimensional characteristics: its width measured perpendicular to the optical center axis and parallel to the bonding interface is between 1.2-micron to 5.0-micron, and its height measured perpendicular to the optical center axis and to the bonding interface is between 1.2-micron to 5.0-micron. The air channel cross-sectional area perpendicular to the optical center axis is proportional to the light wavelength for optimizing single mode transmission. The exact dimensions for the trench for the SHOW-ODR device for the air channel according to the present invention depend upon the following: refractive indices of the first material layer and second material layer making up the ODR, desired communication bandwidth, cost considerations, and optimization for single mode transmission for the SHOW-ODR.

The aforementioned semiconductor top substrate and bottom substrate for the SHOW-ODR include Si, SiO2, Al2O3, CaCO3, LiNbO3, BaTiO3, semiconductor alloys (III-V), and semiconductor alloys (II-VI).

However, according to another embodiment of the present invention, the SHOW-ODR can be made without having the top substrate nor the bottom substrate. That is, the SHOW-ODR device comprises a first omni-directional reflector with a trench, a second omni-directional reflector located on the first omni-directional reflector to cover the trench, wherein the trench, a portion of the first omni-directional reflector, and a portion of the second omni-directional reflector together form the air channel.

In addition, the present invention also provides a method of manufacturing a SHOW-ODR device. The method comprises the steps of providing a top substrate and a bottom substrate and forming a trench on the bottom substrate. Furthermore, several thin layers of stacking a plurality of alternating layers of a first material layer and a second material layer are formed on both the top substrate and the bottom substrate, wherein the alternating layers of the first material layer and the second material layer on the bottom substrate and the top substrate are a first multi-layered structure and a second multi-layered structure respectively. A wafer bonding is performed to join the bottom substrate and the top substrate, wherein the first multi-layered structure is directly in contact with the second multi-layered structure.

The trench in the bottom substrate is made by dry etching techniques. The technique includes etching using inductive coupled plasma.

The alternating layers of a plurality of first material layers and second material layers are made by plasma-enhanced chemical vapor deposition, low-pressure chemical vapor deposition, sputtering, thermal coating, E-gun, molecular beam epitaxy, or metal-organic chemical vapor depositions. Typically, these techniques are to repeatedly deposit a plurality of layers of first material layer/second material layer, for example, Si/SiO2, of precise and even thicknesses on the substrate surface of the first omni-directional reflector In the present invention, for a wide C+L bandwidth, the polarization independent loss is found to be uniform. Although, only a preferred bandwidth of C+L is used in the embodiments of the present invention, it is assumed that the present invention also applies to all other communication frequency bands.

BRIEF DESCRIPTION OF THE DRAWINGS

Further aspects of the present invention, and further features and benefits thereof, are described below. The accompanying drawings, which are incorporated herein and form a part of the specification, illustrate the present invention and, together with the description, further server to explain the principles of the invention and to enable a person skilled in the pertinent art to make and use the invention.

DETAILED DESCRIPTION OF THE EMBODIMENTS

Hereinafter, the embodiments of the present invention will be described in detail with reference to the accompany drawings.

Figure 1:
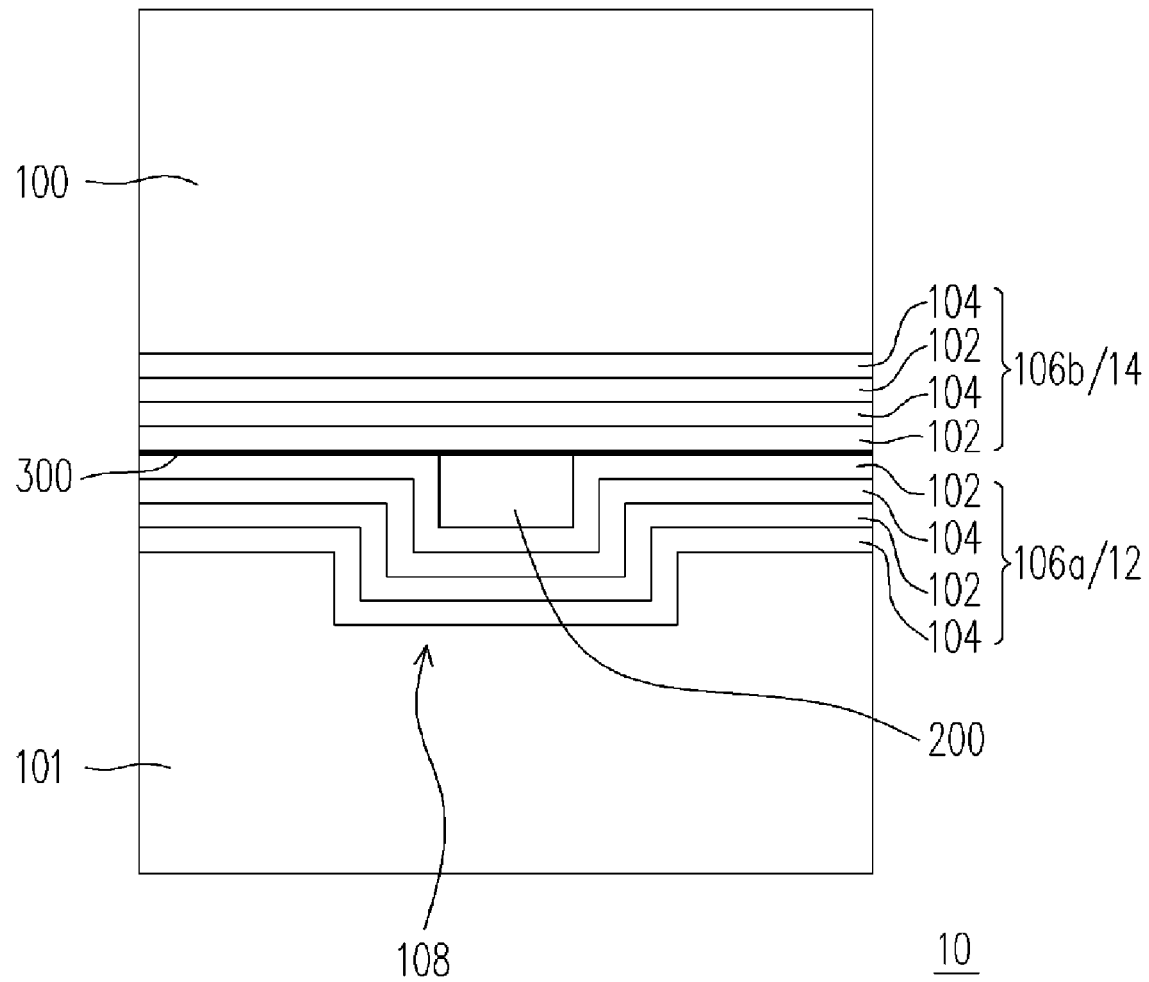
FIG. 1 illustrates cross-sectional view of SHOW-ODR, according to one preferred embodiment of the present invention.

FIG. 1 illustrates a cross-sectional view of a SHOW-ODR device 10, according to one embodiment of the present invention. The SHOW-ODR device 10 includes a bottom substrate 101 having a trench 108 within, a first omni-directional reflector 12 conformal located on the bottom substrate 101. The SHOW-ODR device 10 further comprises a top substrate 100 having a second omni-directional reflector 14 and located on the bottom substrate 101 with the second omni-directional reflector 14 in contact with the first omni-directional reflector 12. Notably, a portion of the first omni-directional reflector 12 in the trench 108 and a portion of the second omni-directional reflector 14 over the trench 108 together form an air channel 200.

The aforementioned first omni-directional reflector 12 include a plurality of first material layers 102 having a first refractive index; and a plurality of second material layers 104 having a second refractive index. In addition, the first material layer 102 and the second material layer 104 are alternatively arranged. Moreover, the ratio of the first refractive index to the second refractive index is no less than 1.5. Also, the aforementioned second omni-directional reflector 14 includes a plurality of first material layers 102 having a first refractive index and a plurality of second material layers 104 having a second refractive index. The first material layer 102 and the second material layer 104 are alternatively arranged and the ratio of the first refractive index to the second refractive index is no less than 1.5.

The aforementioned alternating layers of the first material layers 102 and the second material layers 104 forms composite structures referred to as the multi-layered structure 106a and the multi-layered structure 106b conformally formed on the bottom substrate 101 and the top substrate 100 respectively. Furthermore, in FIG. 1, the multi-layered structure 106a and the multi-layered structure 106b are composed of tow pairs of the stacking first material layer 102 and the second material layer 104 respectively. However, multi-layered structures 106a and 106b in the present invention are not limited to be composed of only two pair of the stacking first material layer 102 and the second material layer 104 respectively. The number of the pairs of the stacking first material layer 102 and the second material layer 104 varies and depends on the refraction result of each pair of the stacking first material layer 102 and the second material layer 104.

The first material layer 102 includes Si, SiO2, TiO2, GaAs, InP, and InAlGaAs. In addition, the second material layer 104 includes the oxide of Si, GaAs, InP, and InAlGaAs. Although both the first material layer and second material layer come from the same list of possible materials, they cannot be identical for the same SHOW-ODR device 10. In other words, the adjacent alternating first material layer and second material layer must include materials of different refractive indices.

In addition, the aforementioned air channel 200 for the SHOW-ODR device 10 has the following dimensional characteristics. The width of the air channel 200 measured perpendicular to the optical center axis and parallel to the bonding interface 300 is between 1.2-micron to 5.0-micron. Also, the height of the air channel 200 measured perpendicular to the optical center axis and to the bonding interface 300 is between 1.2-micron to 5.0-micron. The air channel 200 cross-sectional area perpendicular to the optical center axis is proportional to the light wavelength for optimizing single mode transmission within the air channel 200.

The aforementioned semiconductor top substrate 100 and bottom substrate 101 for the SHOW-ODR device 10 include Si, SiO2, Al2O3, CaCO3, LiNbO3, BaTiO3, semiconductor alloys (III-V), and semiconductor alloys (II-VI).

Figure 2:
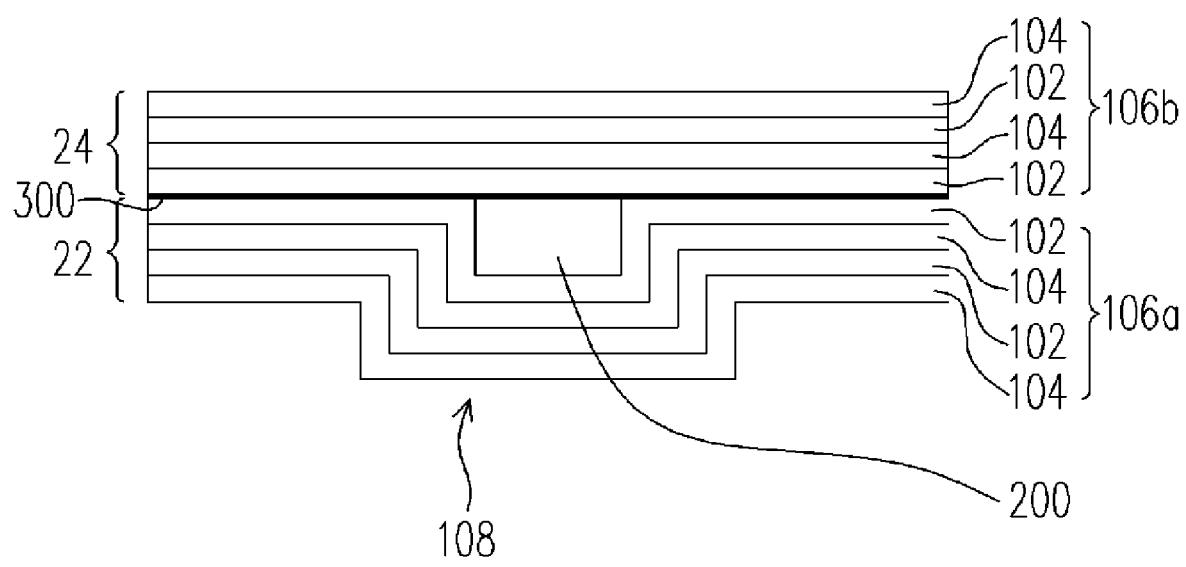
FIG. 2 illustrates a cross-sectional view of SHOW-ODR, according to another preferred embodiment of the present invention.

FIG. 2 illustrates a cross-sectional of a SHOW-ODR device 20 according to another embodiment of the present invention. According to this embodiment, the SHOW-ODR device 20 can be made without having the top substrate 100 nor the bottom substrate 101. Hence, the SHOW-ODR comprises a first omni-directional reflector 22 with a trench 108, a second omni-directional reflector 24 located on the first omni-directional reflector 22 to cover the trench 108. Further, a portion of the first omni-directional reflector 22, and a portion of the second omni-directional reflector 24 together form the air channel 200. It should be noticed that the second omni-directional reflector 24 and the first omni-directional reflector 22 are the same as the multi-layered structure 106a and the multi-layered structure 106b in the previous preferred embodiment of the present invention (as shown in FIG. 1).

Figure 3A:
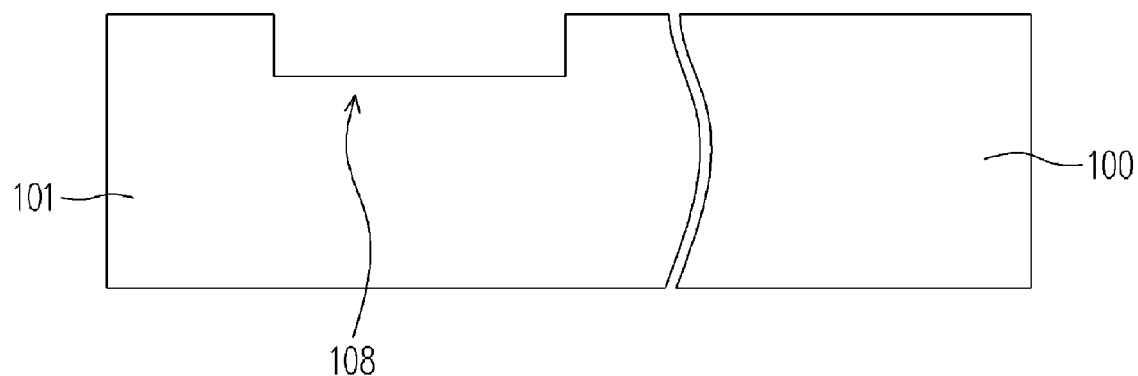
FIGS. 3A through 3C illustrate cross-sectional views of a manufacturing process for SHOW-ODR, according to one preferred embodiment of the present invention.
Figure 3B:
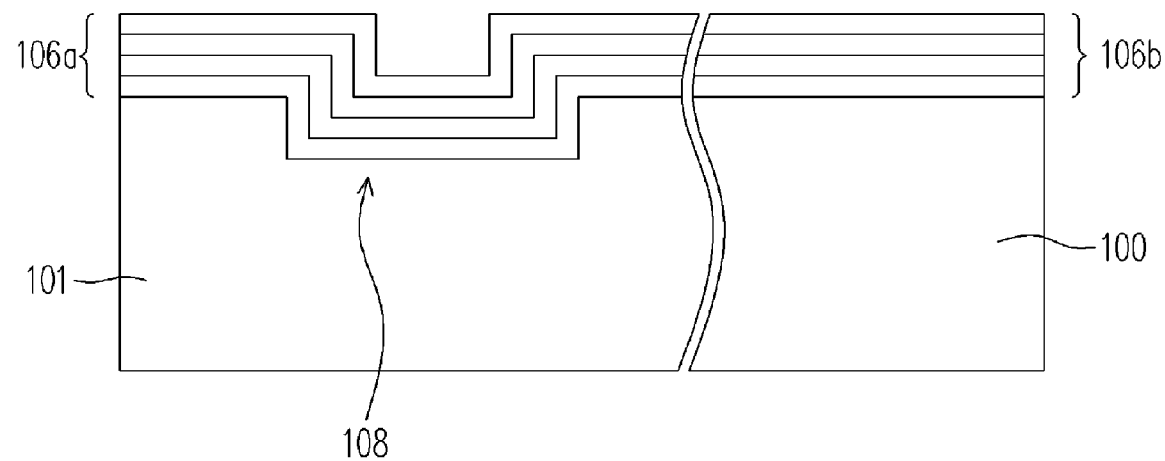
Figure 3C:
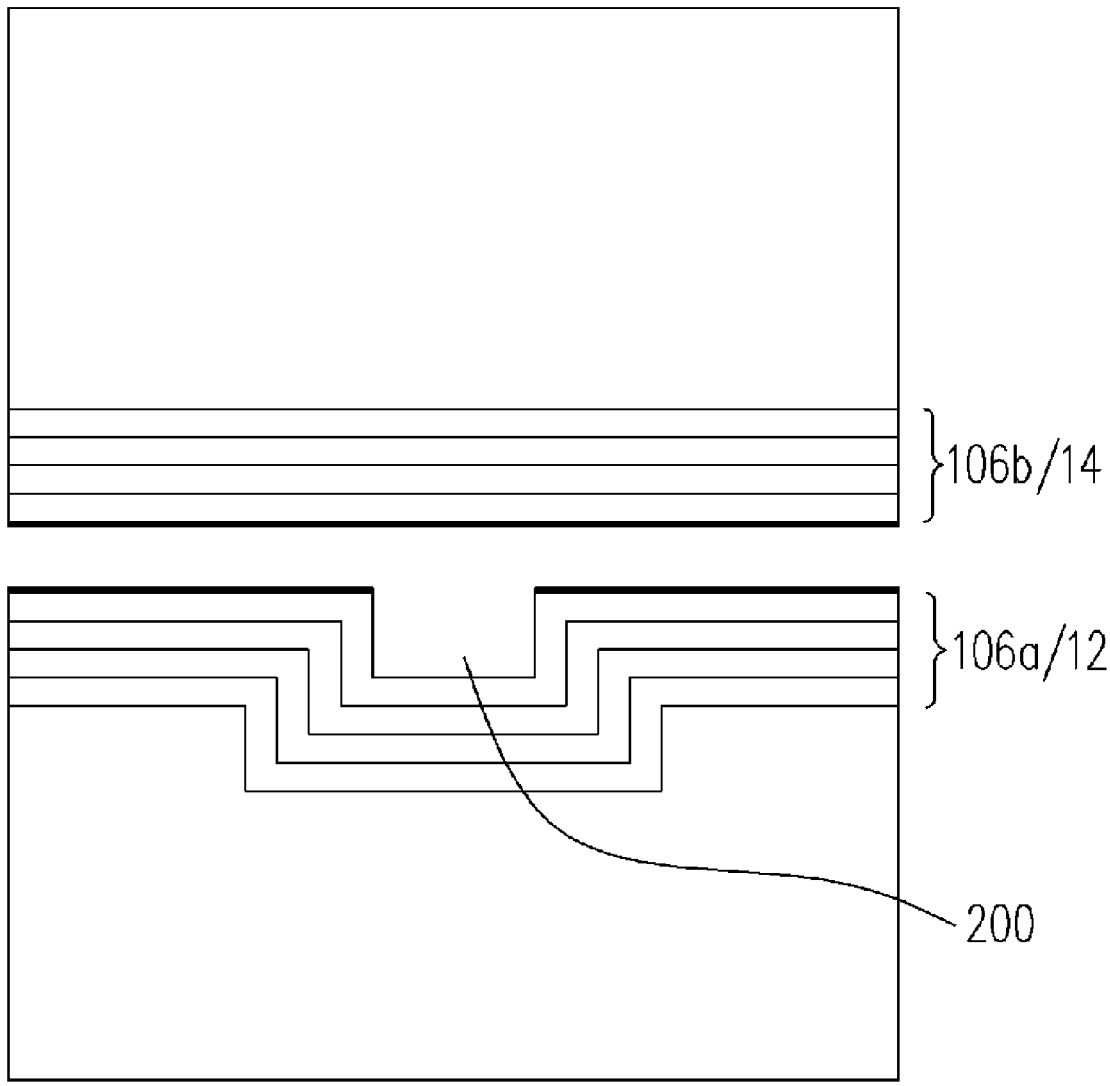

FIGS. 3A through 3C illustrate cross-sectional views of a manufacturing process for SHOW-ODR, according to one preferred embodiment of the present invention. As shown in FIG. 3A, a top substrate 100 and a bottom substrate 101 are provided. Notably, a trench 108 is formed in the bottom substrate 101. Further, the trench 108 in the bottom substrate 101 can be, for example, made by dry etching technique. The dry etching technique includes etching using inductive coupled plasma.

Moreover, as shown in FIG. 3B, several thin layers of stacking a plurality of alternating layers of a first material layer 102 and a second material layer 104 are conformally formed on both the top substrate 100 and the bottom substrate 101. In addition, the alternative layers of the first material layers 102 and the second material layers 104 forms composite structures referred to as the multi-layered structure 106a and the multi-layered structure 106b conformally formed on the bottom substrate 101 and the top substrate 100 respectively. Also, in the functional point of view, the multi-layered structure 106a and the multi-layered structure 106b can be also indicated as a first omni-directional reflector 12 and a second omni-directional reflector 14 in the later description.

The alternating layers of a plurality of first material layers 102 and second material layers 104 can be, for example but not limited to, made by plasma-enhanced chemical vapor deposition, low-pressure chemical vapor deposition, sputtering, thermal coating, E-gun, molecular beam epitaxy, or metal-organic chemical vapor depositions. Typically, these techniques are to repeatedly deposit a plurality of layers of first material layer 102/second material layer 104, for example, Si/SiO2, of precise and even thicknesses on the bottom substrate 101 and the top substrate 100. As an example of the above technique for the deposition step, low-pressure chemical vapor deposition method is used for reducing the surface roughness of the first omni-directional reflector 12 and the second omni-directional reflector 14. Further, the first material layer 102 can reach as low as 10 nm in thickness and the second material layer 104 can reach as low as 25 nm in thickness by using low-pressure chemical vapor deposition or plasma-enhanced chemical vapor deposition. Moreover, an annealing process can also be done on the first omni-directional reflector 12 and the second omni-directional reflector 14 after the multiple-layered structures 106a and 106b are formed.

As shown in FIG. 3C, a wafer bonding is performed to join the first omni-directional reflector 12 and the second omni-directional reflector 14, wherein the multi-layered structure 106b is directly in contact with the multi-layered structure 106a. In addition, the wafer bonding comprising anodic bonding, fusion bonding, high vaccum bonding, and chemical bonding are used for bonding the first omni-directional reflector 12 and the second omni-directional reflector 14. Moreover, a post treatment including the mechanical polishing is performed on the edges of both the first omni-directional reflector 12 and the second omni-directional reflector 14.

The manufacturing of the second omni-directional reflector 14 is identical in procedure as that for the first omni-directional reflector 12. More specifically, the first omni-directional reflector 12 and the second omni-directional reflector 14 can be formed on the same wafer and then separated apart from each other after the multi-layered structures are formed. That is, the multi-layered structure 106a and the multi-layered structure 106b are formed in the same process step.

The minimum bandgap used for transmitting signal within the SHOW-ODR device 10 in the present invention is between 1480 and 1640 nm. The air channel's cross-sectional area perpendicular to the light transmitting path is proportional to the wavelength of the light which is transmitting within the air channel in a form of single mode transmission. The bandwidth mentioned above implies that the SHOW-ODR device 10 is within the typical specifications for optical fiber communication. However, the present invention is not limited to be applied with the light with the bandwidth mention above. That is, the present invention can be also applied to all other communication frequency bands. Because the light is in a form of single mode transmission mode to be transmitting within the SHOW-ODR device 10, the polarization independent loss is found to be uniform. Moreover, the multi-layered structures on both the bottom substrate and the top substrate respectively are formed by using the conventional manufacturing process so that the manufacturing cost is low.

It will be apparent to those skilled in the art that various modifications and variations can be made to the structure of the present invention without departing from the scope or spirit of the invention. In view of the foregoing, it is intended that the present invention cover modifications and variations of the present invention provided they fall within the scope of the following claims and their equivalents.

What is claimed is:

1. A method of manufacturing a SHOW-ODR device, comprising:

providing a top substrate and a bottom substrate;

forming a trench on the bottom substrate;

forming thin layers of stacking a plurality of alternating layers of a first material layer and a second material layer on both the top substrate and the bottom substrate, wherein the alternating layers of the first material layer and the second material layer on the bottom substrate and the top substrate are a first multi-layered structure and a second multi-layered structure respectively; and performing a wafer bonding to join the bottom substrate and the top substrate, wherein the first multi-layered structure is directly in contact with the second multi-layered structure, and the wafer bonding includes anodic bonding, fusion bonding, high vacuum bonding, or chemical bonding.

2. The method of manufacturing the SHOW-ODR device of claim 1, wherein tie Wench in the bottom substrate is made by dry etching techniques.

3. The method of manufacturing the SHOW-ODR device of claim 1, wherein die alternating layers of a plurality of first material layers and second material layers are made by plasma-enhanced chemical vapor deposition, low-pressure chemical vapor deposition, sputtering, thermal coating, E-gun, molecular beam epitaxy, or metal-organic chemical vapor depositions.

4. The method of manufacturing the SHOW-ODR device of claim 1, wherein the first material layers has a first refractive index, the second material layers has a second refractive index and the ratio of the first refractive index to the second refractive index is no less than 1.5.

5. The method of manufacturing the SHOW-ODR device of claim 1, wherein the first material layer for the first omni-directional reflector includes SiO2, TiO2, GaAs, InP, and InAlGaAs.

6. The method of manufacturing the SHOW-ODR device of claim 1, wherein the second material layer for the first omni-directional reflector includes SiO2, TiO2, GaAs, InP, and InAlGaAs.

* * * * *